United States Patent

Hineribara et al.

Patent Number: 5,377,449
Date of Patent: Jan. 3, 1995

[54] GLASS-RUN CHANNEL

[75] Inventors: Takashi Hineribara; Yasunori Kamei; Ryusuke Miura, all of Hiroshima, Japan

[73] Assignee: Nishikawa Rubber Co., Ltd., Hiroshima, Japan

[21] Appl. No.: 68,552

[22] Filed: May 27, 1993

[30] Foreign Application Priority Data

May 28, 1992 [JP] Japan ................ 4-43148[U]

[51] Int. Cl.6 ............................ E06B 7/16
[52] U.S. Cl. ........................ 49/441; 428/122
[58] Field of Search .......... 49/440, 441, 495.1, 49/489.1, 475.1; 428/122

[56] References Cited

U.S. PATENT DOCUMENTS

| 3,918,206 | 11/1975 | Dochnahl | 428/122 X |
| 4,314,872 | 2/1982 | Schiesser | 49/440 X |
| 4,511,526 | 4/1985 | Yamaguchi | 428/122 X |
| 4,913,976 | 4/1990 | Brooks et al. | 428/122 X |
| 5,007,202 | 4/1991 | Guillon | 49/441 |

FOREIGN PATENT DOCUMENTS

| 3442840 | 6/1985 | Germany | 49/441 |
| 62-255218 | 11/1987 | Japan | 49/441 |

Primary Examiner—Peter M. Cuomo
Assistant Examiner—Jerry Roman
Attorney, Agent, or Firm—Flynn, Thiel, Boutell & Tanis

[57] ABSTRACT

A glass-run channel is capable of reducing the sliding resistance by reducing the deformation resistance thereof to thereby cause the glass to move with ease. It comprises a body 10 having an opening which is in a U-shape in cross section and lips 21 and 22 which protrude from both ends of the opening of the body 60 toward the center line of the body 10 through which a glass 30 slides wherein the glass-run channel is formed of two kinds of materials. That is, the body 10 is formed of a soft material S having a JIS (A) hardness of 30 to 80 degrees, preferably 60 to 75 degrees and partly formed of a hard material H having a JIS (A) hardness of 70 to 100 degrees, preferably 85 to 95 degrees at least at part thereof where the body 10 elastically contacts the glass 30 wherein the portion where the lips 21 and 22 elastically contacts the glass 30 is harder than the body 10.

12 Claims, 3 Drawing Sheets

GLASS-RUN CHANNEL

BACKGROUND OF THE INVENTION

1. Field of the Invention

The present invention relates to a glass-run channel attached to a door sash for sealing the gap between a door and a glass of a car for reducing a sliding resistance of the glass.

2. Prior Art

A conventional glass-run channel will be described with reference to FIGS. 1 and 2.

The glass-run channel attached to a door sash for sealing the gap between the door and the glass comprises a body 60 having an opening which is in a U-shape in cross section and lips 71 and 72 which protrude from the both ends of the opening of the body 60 toward the center line of the body 60 through which a glass 30 slides.

The sliding resistance of the glass 30, namely, the resistance which the glass receives when it slides comprises a frictional resistance and a deformation resistance which are proportional to the repulsive force which occurs when the glass 30 pushes open the lips 71 and 72 of the glass-run channel. The deformation resistance is larger than the frictional resistance, which causes the problem for making the sliding resistance of the glass 30 large. That is caused by the fact that when the glass 30 pushes the lips 71 and 72 open as it moves as illustrated in FIG. 1, the push open length is small but the push open angle is large, i.e. the deformation amount (X+Y) per moving distance Z of the glass 30 is large. To cope with the problem, a lower hardness material is adopted by the lips 71 and 72 so as to reduce the repulsive force of the lips 71 and 72, which has however caused another problem that the function to guide and hold the glass 30 is deteriorated.

SUMMARY OF THE INVENTION

The present invention solved the problems of the conventional glass-run channel and has an object to provide a glass-run channel capable of reducing the sliding resistance by reducing the deformation resistance thereof to thereby cause the glass to move with ease.

To achieve the above object, the glass-run channel of the present invention comprises a body 60 having an opening which is in a U-shape in cross section and free end portions 21 and 22 of lip members 18 and 20 which protrude from both ends of the opening of the body 60 toward the center line of the body 10 through which a glass 30 slides characterized in that the body 10 is formed of a soft material S having a Japanese Industrial Standards (hereinafter as JIS) (A) hardness of 30 to 80 degrees, preferably 60 to 75 degrees, and partly formed of a hard material H having a JIS (A) hardness of 70 to 100 degrees, preferably 85 to 95 degrees, at least at part thereof where the body 10 elastically contacts the glass 30 except the root portions of the lips 18 and 20 wherein the portion where the free end portions 21 and elastically contact the glass 30 is harder than the body 10.

PREFERRED EMBODIMENT OF THE INVENTION

A glass-run channel according to the present invention will be described with reference to FIG. 3 to 7.

Figure 5:
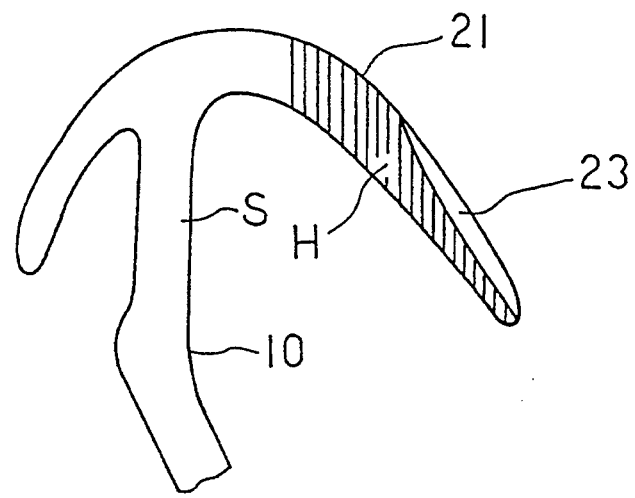
FIG. 5 is a cross-sectional view according to a first modification which corresponds to IV—IV of FIG. 3.

Denoted at 10 is a body which is in a U-shape in cross section, 12 is a base or bottom member, 14 and 16 are spaced-apart leg members extending from opposite ends of the base member, 18 and 20 are lip members, 21 and 22 are free end portions of the respective lip members, 24 and 26 are root or joint portions of the respective lip members, and 23 is a cavity defined by the body 10. The base member 12, leg members 14 and 16, and joint portions 21 and 22 are all formed of a soft material S having a JIS (A) hardness of 30 to 80 degrees, preferably, 60 to 75 degrees. The free end portions 21, 22 extend from the respective joint portions 24, 26 toward a center line of the cavity 23 and elastically contact the door glass 30. The free end portions 21, 22 are entirely formed of a hard material H having a JIS (A) hardness of 70 to 100 degrees, preferably 85 to 95 degrees. A layer 23 formed of the soft material S may be formed at least on either surface of the free end portions 21 and 22 as illustrated in FIG. 5. The bottom portion 12 of the body 10 may be formed of the hard material H at an entire intermediate portion 11 thereof as illustrated in FIG. 6 or a partial portion thereof as illustrated in FIG. 7.

Since either of the free end portions 21 and 22 which elastically contacts the glass 30 is entirely formed of the hard material H having a JIS (A) hardness of 70 to 100 degrees, preferably 85 to 95 degrees and the rest thereof including the root portions thereof is formed of the soft material S, the repulsive force of the glass-run channel is the same as that of the conventional glass-run channel and the function to guide and hold the glass 30 is the same as that of the conventional glass-run channel. Furthermore, the rigidity of either of the free end portions 21 and 22 becomes high when the glass 30 moves so that the push open length of the free end portions 21 and 22 which are closed and positioned ahead the glass 30 becomes large and the push open angle becomes small. That is, the deformation amount (X+Y) per moving distance Z of the glass 30 becomes small to thereby reduce the push open resistance of the free end portions 21 and 22 and the sliding resistance which the glass 30 receives from the glass-run channel, which causes the glass 30 to move with ease.

It is possible to prevent the deterioration of the sealing property by forming the layer 23 formed of the soft material S on the surface of the glass-run channel which elastically contacts the glass 30 according to the first modification as illustrated in FIG. 5.

Figure 6:
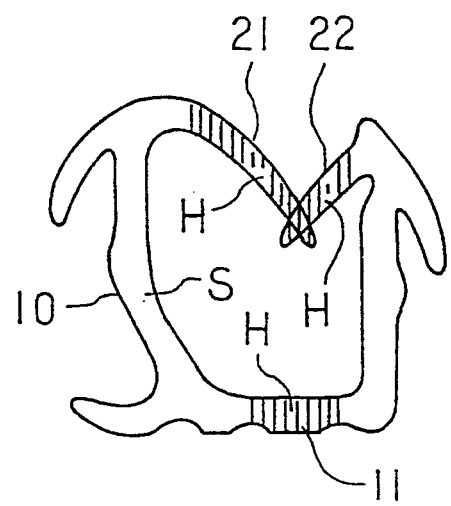
FIG. 6 is a cross-sectional view according to a second modification which corresponds to IV—IV of FIG. 3.
Figure 7:
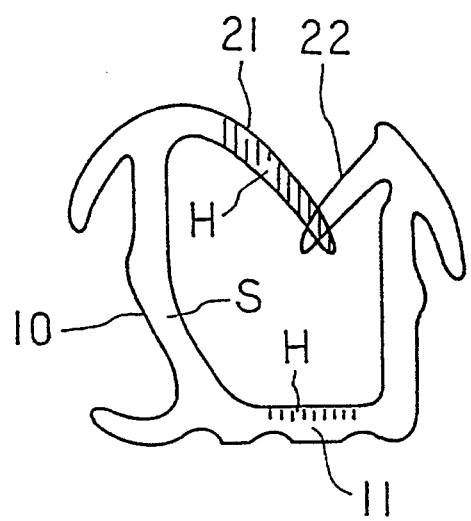
FIG. 7 is a cross-sectional view according to a third modification which corresponds to IV—IV of FIG. 3.

It is possible to reduce the amount of deformation at the bottom portion of the body 10 and also reduce the sliding resistance involved in the movement of the glass 30 by forming the entire or the partial intermediate portion 11 of the bottom portion 12 of the body 10 formed of the hard material H according to the second and third modifications as illustrated in FIGS. 6 and 7.

With the arrangement set forth above, since at least one of the free end portions 21 and 22 becomes high in its rigidity when the glass 30 moves, the amount of deformation per moving resistance of the glass 30 becomes small and the push open resistance of the free end portions 21 and 22 is reduced and furthermore the sliding resistance which the glass 30 receives from the glass-run channel is reduced, which causes the glass 30 to open with ease.

What is claimed is:

1. A glass run channel for sealing a gap between a vehicle door and a vehicle door glass comprising:
   a U-shaped body having a base member, and first and second spaced-apart leg members extending substantially in the same direction from opposite ends of said base member, the body defining a cavity for receiving a peripheral edge of the vehicle door glass;
   a first lip member having at one end thereof a first joint portion pivotally coupling the first lip member to the first leg member, and an elongated first free end portion extending from the first joint portion toward the cavity for contact with one side of the vehicle door glass;
   a second lip member having at one end thereof a second joint portion pivotally coupling the second lip member to the second leg member, and an elongated second free end portion extending from the second joint portion toward the cavity for contact with the other side of the vehicle door glass, the second lip member mutually opposing the first lip member; and
   said base member, leg members and joint portions all being formed of a first material having a first JIS (A) hardness, and at least one free end portion being formed entirely of a second material having a second JIS (A) hardness which is greater than said first JIS (A) hardness to reduce a sliding resistance of said one free end portion where it contacts the vehicle door glass.

2. The run channel claimed in claim 1, wherein the first JIS (A) hardness is in the range of about 30 to 80 degrees, and the second JIS (A) hardness is in the range of about 70 to 100 degrees.

3. The run channel claimed in claim 2, wherein the first JIS (A) hardness is in the range of about 60 to 75 degrees, and the second JIS (A) hardness is in the range of about 85 to 95 degrees.

4. The run channel claimed in claim 3, wherein the first and second free end portions are each formed entirely of the second material.

5. The run channel claimed in claim 1, wherein said one free end portion includes a layer of material formed on a surface portion thereof which elastically contacts the vehicle door glass to prevent deterioration of the sealing property where the one free end portion contacts the glass.

6. The run channel claimed in claim 5, wherein the layer of material formed on said one free end portion is formed from the first material.

7. The run channel claimed in claim 6, wherein the first JIS (A) hardness is in the range of about 30 to 80 degrees, and the second JIS (A) hardness is in the range of about 70 to 100 degrees.

8. The run channel claimed in claim 7, wherein the first JIS (A) hardness is in the range of about 60 to 75 degrees, and the second JIS (A) hardness is in the range of about 85 to 95 degrees.

9. The run channel claimed in claim 1, wherein an intermediate portion of the base member is at least partially formed from the second material.

10. The run channel claimed in claim 9, wherein the intermediate portion of the base member is entirely formed of the second material.

11. The run channel claimed in claim 10, wherein the first JIS (A) hardness is in the range of about 30 to 80 degrees, and the second JIS (A) hardness is in the range of about 70 to 100 degrees.

12. The run channel claimed in claim 11, wherein the finest JIS (A) hardness is in the range of about 60 to 75 degrees, and the second JIS (A) hardness is in the range of about 85 to 95 degrees.

* * * * *

UNITED STATES PATENT AND TRADEMARK OFFICE
CERTIFICATE OF CORRECTION

PATENT NO.  : 5 377 449
DATED       : January 3, 1995
INVENTOR(S) : Takashi Hineribara et al It is certified that error appears in the above-indentified patent and that said Letters Patent is hereby corrected as shown below:

Column 2, line 23; change "23" to ---25---.

Column 2, line 29; change "23" to ---25---.

Column 4, line 40; change "finest" to ---first---.

UNITED STATES PATENT AND TRADEMARK OFFICE
CERTIFICATE OF CORRECTION

Figure 1:
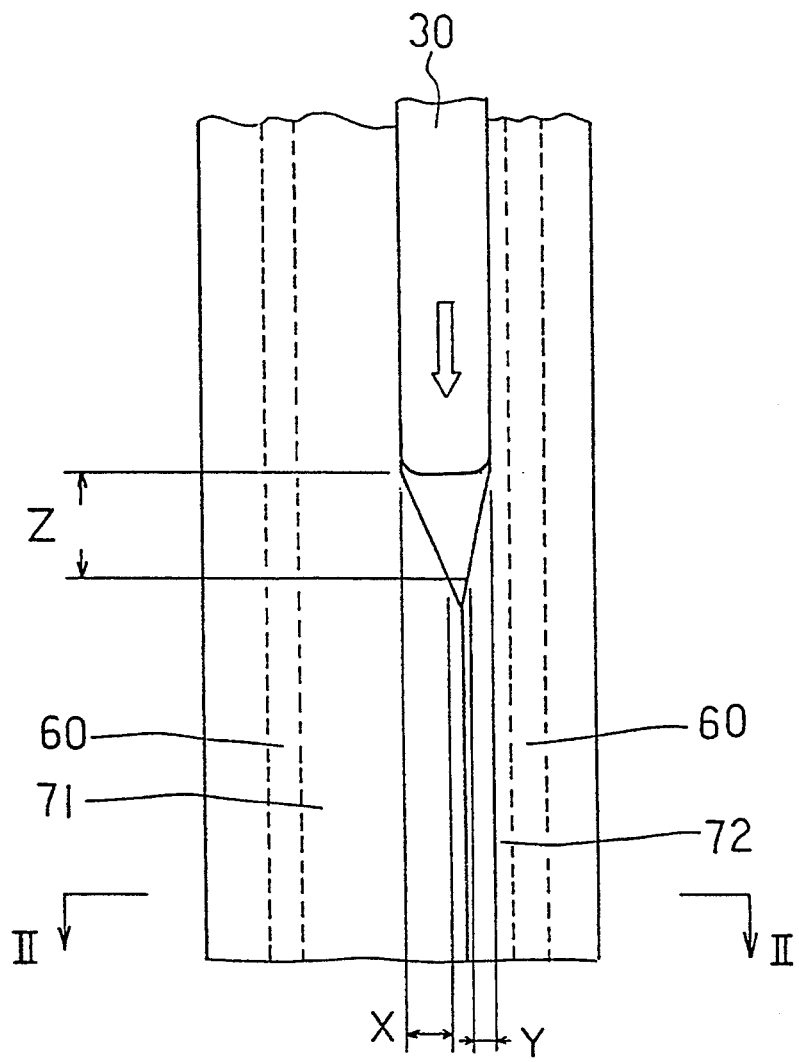
FIG. 1 is a front view showing a conventional glass-run channel.
Figure 2:
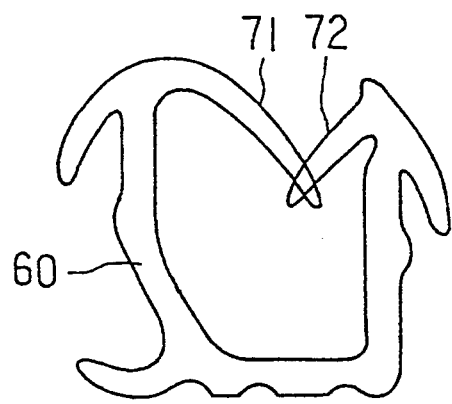
FIG. 2 is cross-sectional view taken along II—II of FIG. 1.
Figure 3:
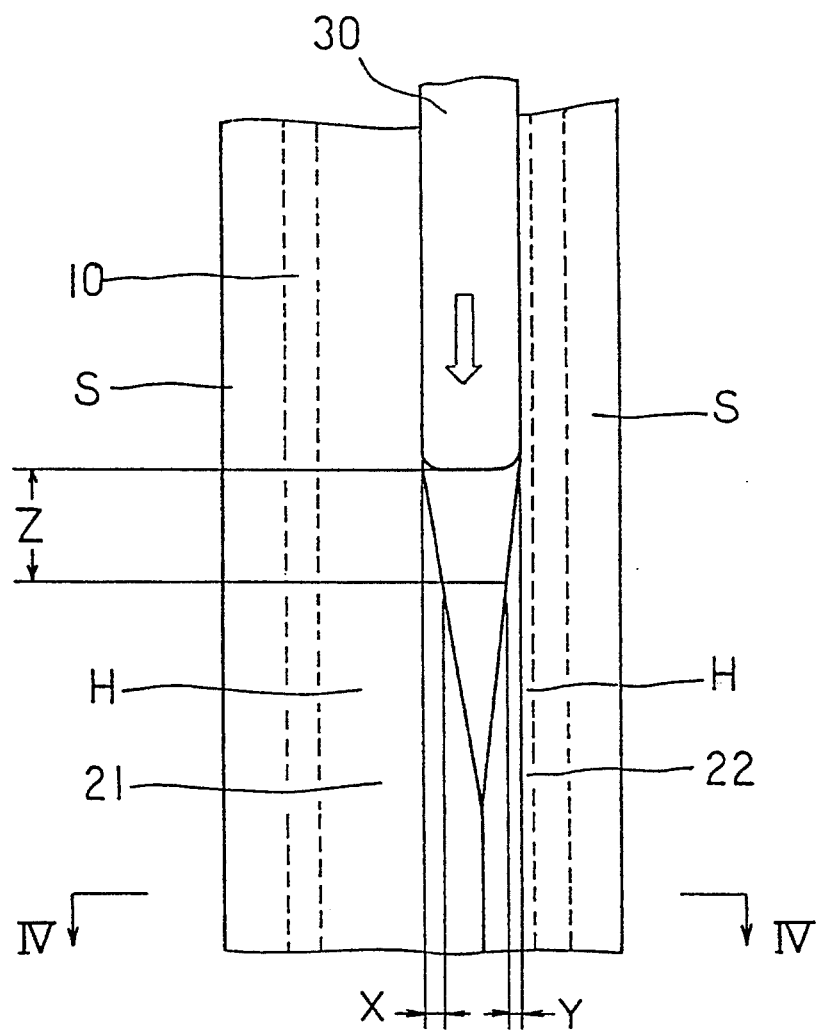
FIG. 3 is a front view of a glass-run channel according to a preferred embodiment of the present invention.
Figure 4:
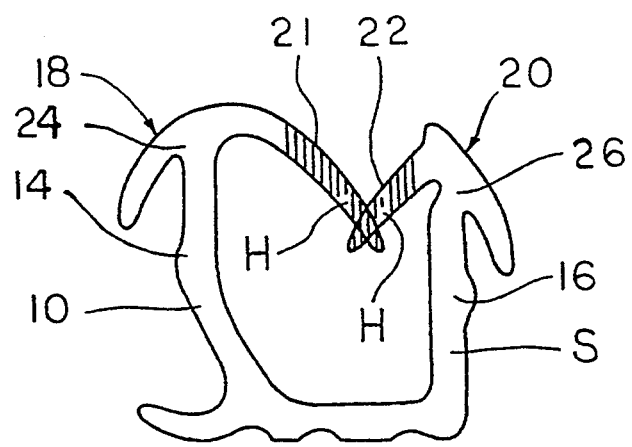
FIG. 4 is a cross-sectional view taken along IV—IV of FIG. 3.

PATENT NO.  : 5 377 449
DATED       : January 3, 1995
INVENTOR(S) : Takashi Hineribara et al It is certified that error appears in the above-indentified patent and that said Letters Patent is hereby corrected as shown below:

Please replace Figure 4 with the Figure 4 below:

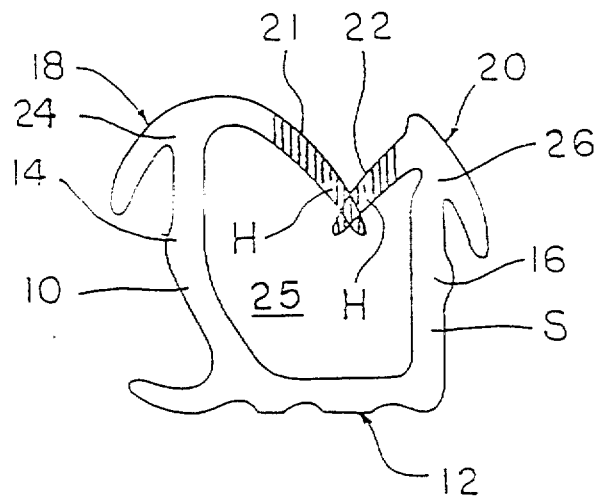

Signed and Sealed this

Thirteenth Day of June, 1995

*Attest:*

BRUCE LEHMAN

*Attesting Officer*    Commissioner of Patents and Trademarks